United States Patent Office 3,795,738
Patented Mar. 5, 1974

3,795,738
USE OF L-PROPYL L-LEUCYL GLYCINE AMIDE
TO TREAT PARKINSON'S DISEASE
Nicholas Peter Plotnikoff, Lake Bluff, Ill., assignor to
Abbott Laboratories, North Chicago, Ill.
No Drawing. Continuation-in-part of application Ser. No.
188,600, Oct. 12, 1971, which is a continuation-in-
part of application Ser. No. 174,955, Aug. 25, 1971,
both now abandoned. This application Dec. 26, 1972,
Ser. No. 318,142
Int. Cl. A61k 27/00
U.S. Cl. 424—274  4 Claims

ABSTRACT OF THE DISCLOSURE

Covers the use of L-prolyl L-leucyl glycine amide in treating Parkinson's disease.

CROSS REFERENCE TO RELATED APPLICATIONS

This application is a continuation-in-part of copending application U.S. Ser. No. 188,600, filed Oct. 12, 1971, and now abandoned which in turn was a continuation-in-part of copending application U.S. Ser. No. 174,955, filed Aug. 25, 1971, and now abandoned.

BACKGROUND OF THE INVENTION

Parkinsonism is generally characterized by involuntary tremors, diminished motor power and rigidity. The onset of the disease is insidious, with increasing rigidity or tremors or both. The patient's facial expression may be fixed or less mobile than normal; smiling spreads and slowly disappears. Body movements generally become slower. There may be gradually increased rigidity with diminished swaying of the arms during walking. Generally, the patient's legs may begin to feel stiff and excessive effort may be required to lift them from the ground while walking. Patients often assume a stooping posture and shuffle rather than walk. As the disease progresses, movements such as adjusting a tie, buttoning a coat, etc. become impossible.

The disease is usually slowly progressive and patients may live for many years. However, with increased disability, patients often become depressed, anxious, and emotionally disturbed. While treatment with various drugs such as antispasmodics, central nervous system stimulants and the like have been used alone or in combination to produce temporary amelioration of complaints L-Dopa was the first effective single agent in the treatment of the disease.

L-Dopa has been reported to be effective against the akinesia and rigidity of Parkinsonism, particularly in extremely severe cases. An increase in mental alertness and wakefulness, relief from depression and an increase in intellect has also been observed.

While L-Dopa has produced some rather promising results in experimental therapy, in some instances it does not show benefits unless used in relatively large amounts. This causes undesirable side effects such as nausea, vomiting, hypotension, and abnormal involuntary movements as well as mental changes.

It would, therefore, be a significant advance in the art if a composition was found which could be used effectively to treat Parkinson's disease at relatively low dosage levels, and also avoid the above unwanted side effects. In addition it would be most desirable to have a drug that acts via a mechanism different from that of L-Dopa, so that the two drugs could be used in conjunction to provide more effective relief at non-side-effect producing dosages.

SUMMARY OF THE INVENTION

It therefore, becomes an object of the invention to provide a composition useful in treating Parkinsonism. A specific object of the invention is to provide a method of treating Parkinsonism with a drug exhibiting a low level of side effects, if any, and which does not become tolerated over extended usage as well as having a mechanism of action different from that L-Dopa. Essentially, the invention here is concerned with the use of L-prolyl L-leucyl glycine amide in treating Parkinson's disease. Said amide may be used alone or in combination with other useful drugs such as L-Dopa.

DETAILED DESCRIPTION OF THE INVENTION

L-prolyl L-leucyl glycine amide has recently been synthesized and the tripeptide structure is now known and is as follows:

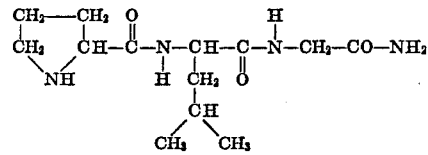

(See, for example, Celis, et al., Biophysical Soc. Abstract TPM-K 12, pp. 98 a, 1971.)

For convenience this amide will hereinafter be referred to as tripeptide.

It has been found here that this tripeptide provides excellent activity against Parkinson's disease at surprisingly low dosages. It has also been found that the dosage level for humans of 1–40 mg./kg. of body weight daily is quite critical. If, for example, the dosage is less than the just-stated minimum no effect is noted. However, on the other hand, if the dosage is in excess of the maximum stated amount, the drug may exhibit an undesirable sedative effect. More often, the practical dosage range for best results is 1–20 mg./kg. of body weight daily.

The above tripeptide is particularly useful when used in combination with L-Dopa. When administered in a unit dosage form, the tripeptide will be present in an amount of 1–250 mgs. and the L-Dopa will be present in an amount of 1–500 mgs. The tripeptide potentiates the activity of L-Dopa and small amounts of tripeptide in combination with L-Dopa show activity where the same disage of L-Dopa is completely ineffective. Usually 0.1–40 mg./kg. of body weight daily of tripeptide and 1–500 mg./kg. of body weight daily of L-Dopa are the dosage levels in the combination treatment. The active ingredients, of course, will be accompanied by a pharmaceutically acceptable carrier. It is understood, of course, that the tripeptide alone may be administered to the patient as well as the combination of tripeptide and L-Dopa. The tripeptide may also be administered in combination with other effective drugs used to treat Parkinson's disease.

For use in treating Parkinson's disease, the tripeptide alone or in combination with L-Dopa or other drugs may be administered in either liquid or in solid form. Thus, the active compounds may be provided in granulation tablet, capsule, elixir and other dosage forms. Oral administration is preferred and is the most convenient. When administered orally in tablets, capsules and pills the tripeptide may be present in an amount of 1–500 mgs. Other means of administering may be employed such as, for example, by intraperitoneal or intramuscular injection. The active ingredients can also be incorporated in an oil or wax base and administered in the form of a suppository.

EXAMPLE I

To date the most sensitive test for potential anti-Parkinson activity is the mouse antioxotremorine test. (G. M. Everett, P. Morse and J. Borcherding, Fed. Proc., 30, 2, 677, 1971). The effects of oxotremorine in mice closely resemble the symptoms of Parkinson's disease.

The following method was employed: Normal male mice were pretreated with varying doses of the tripeptide 1 and 4 hours before administration of oxotremorine which was administered at 0.5 mg./kg., I.P. Hypophysectomized mice were pretreated 4 hours before oxotremorine administration. Four mice were tested at each of the dosages of the tripeptide in the intact and hypophysectomized mice. The responses were recorded by observation techniques and were compared with those observed in 16 intact and 16 hypophysectomized mice which received only oxotremorine as a control.

As can be seen from Tables I and II below the tripeptide was active in reducing the effects of oxotremorine in both normal mice and hypophysectomized mice. The control animals receiving the oxotremorine exhibited marked signs of parasympathetic stimulations consisting of tremors, head twitch, decreased activity, ataxia, lachrymation, salivation and diarrhea.

The tripeptide as seen below antagonized the central and peripheral effects of oxotremorine in normal as well as in hypophysectomized mice. Its effectiveness in hypophysectomized mice demonstrates that it exerts action upon the central nervous system which are independent of its hypothalamic hormone activity.

EXAMPLE III

Another approach for evaluation of anti-Parkinson activity is estimating reversal of the extrapyramidal effects of deserpidine which depletes biogenic amines in animals and in man, which test was employed here.

Specifically, deserpidine was administered to mice 24 hours prior to the test at a level of 50 mg./kg. The deserpidine was administered orally. The mice exhibited symptoms of marked sedation.

Twenty-four hours after administering the deserpidine, L-Dopa was then given by intraperitoneal injection at 100 mg./kg. The L-Dopa had no effect on reversing the effects of deserpidine. It was given a rating of 0. In this test a rating of 0 indicates no effect; a rating of 1 indicates slight effect; a rating of 2 indicates moderate effect and a rating of 3 indicates marked effect.

When a combination treatment involving L-Dopa and tripeptide was employed, definite reversal of the desperidine effects were noted. Here the L-Dopa and tripeptide were also given by intraperitoneal injection at various dosages. Table IV below shows the results of this test,

TABLE I.—NORMAL MICE

| Drug | Number hours test | Dose[1] and route | Tremors | Head twitch | Ataxia | Lachrymation | Salivation | Diarrhea |
|---|---|---|---|---|---|---|---|---|
| Oxotremorine alone | | 0.5 Mg./kg. i.p. | 3 | 3 | 2 | 2 | 3 | 3 |
| L-prolyl, L-leucyl, glycine amide | 1 | 0.5 Mg./kg. oral | 3 | 3 | 2 | 2 | 3 | 3 |
| | | 1 do | 3 | 2 | 2 | 1 | 2 | 2 |
| | | 2 do | 2 | 2 | 2 | 0 | 1 | 2 |
| | | 4 do | 2 | 1 | 2 | 0 | 1 | 1 |
| | | 8 do | 2 | 1 | 1 | 0 | 1 | 0 |
| | | 16 do | 2 | 1 | 1 | 0 | 1 | 0 |
| | | 20 do | 2 | 1 | 1 | 0 | 1 | 0 |
| | | 40 do | 2 | 1 | 1 | 0 | 0 | 0 |
| Do | 4 | 0.5 Mg./kg. oral | 3 | 3 | 2 | 2 | 3 | 3 |
| | | 1 do | 3 | 3 | 2 | 1 | 2 | 2 |
| | | 2 do | 2 | 2 | 2 | 1 | 2 | 2 |
| | | 4 do | 2 | 2 | 2 | 0 | 1 | 1 |
| | | 8 do | 2 | 1 | 2 | 0 | 1 | 1 |
| | | 16 do | 2 | 1 | 1 | 0 | 1 | 0 |
| | | 20 do | 2 | 1 | 1 | 0 | 1 | 0 |
| | | 40 do | 2 | 1 | 1 | 0 | 1 | 0 |

[1] Four mice per dose.

NOTE.—Degree of oxotremorine effects: 3=marked; 2=moderate; 1=slight; 0=none.

TABLE II.—HYPOPHYSECTOMIZED MICE

| Drug | Dose,[1] mg./kg. oral | Tremors | Head twitch | Ataxia | Lachrymation | Salivation | Diarrhea |
|---|---|---|---|---|---|---|---|
| L-prolyl, L-leucyl, glycine amide (4 hour test) | 0.5 | 3 | 3 | 2 | 2 | 3 | 3 |
| | 1 | 3 | 3 | 2 | 2 | 3 | 3 |
| | 2 | 2 | 2 | 2 | 1 | 2 | 2 |
| | 4 | 2 | 2 | 2 | 0 | 1 | 1 |
| | 8 | 2 | 2 | 1 | 0 | 1 | 0 |
| | 16 | 2 | 1 | 1 | 0 | 1 | 0 |
| | 20 | 1 | 1 | 1 | 0 | 1 | 0 |
| | 40 | 1 | 1 | 1 | 0 | 1 | 0 |

[1] Four mice per dose.

NOTE.—Degree of oxotremorine effects: 3=marked; 2=moderate; 1=slight; 0=none.

EXAMPLE II

The tripeptide was also observed to potentiate the effects of L-Dopa in reducing the central and peripheral effects of oxotremorine. Thus a minimally active dose of L-Dopa (100 mg./kg. I.P.) plus tripeptide (0.25 to 1 mg./kg.) provided significant protection against the effects of oxotremorine as shown in Table III below.

and specifically points out the definite potentiation of L-Dopa by combination with tripeptide.

TABLE IV

| Tripeptide plus L-Dopa, mg./kg. | Degree reversal rating |
|---|---|
| 0.1 plus 100 | 0 |
| 0.2 plus 100 | 1 |
| 0.4 plus 100 | 2 |

TABLE III.—OXOTREMORINE ANTAGONISM BY L-PROLYL L-LEUCYL GLYCINE AMIDE AND L-DOPA IN MICE

| | Tremors | Head twitch | Ataxia | Lachrymation | Salivation | Diarrhea |
|---|---|---|---|---|---|---|
| Oxotremorine alone | [1]3 | 2 | 2 | 2 | 3 | 3 |
| I.P. route—L-Dopa alone (mg./kg.): | | | | | | |
| 100 | 2 | 2 | 2 | 1 | 2 | 2 |
| 200 | 1 | 1 | [2]1 | 1 | 1 | 0 |
| 400 | 0 | 1 | [2]0 | 0 | 0 | 0 |
| L-prolyl, L-leucyl glycine amide plus L-Dopa (mg./kg.): | | | | | | |
| 0.1 plus 100 | 2 | 1 | 1 | 1 | 2 | 0 |
| 0.25 plus 100 | 1 | 1 | 0 | 0 | 1 | 0 |
| 0.5 plus 100 | 1 | 1 | 0 | 0 | 1 | 0 |
| 1.0 plus 100 | 1 | 1 | 0 | 0 | 1 | 0 |

[1] Degree of oxotremorine effects: 3=marked; 2=moderate; 1=slight; 0=none.
[2] Increased motor activity.

The following further illusarates pharmaceutical compositions in oral dosage form which are a feature of this invention:

In order to prepare capsules, the following procedure was employed: Specifically, here sufficient pharmaceutical composition was formulated to prepare 1,000 capsules. 25.00 gm. of L-prolyl L-leucyl glycine amide was preblended with 212.5 gm. of lactose, U.S.P. and 12.5 gm. of talc, U.S.P. The preblend was then passed through a suitable screen and the screened powders were then blended. The powders were then filled into gelatin size No. 3 capsules. The filled weight of ten capsules was 2.50 gm. The filled capsules were then cleaned with sodium chloride.

The following formulation is a typical tablet formula which may be used to incorporate the tripeptide:

TABLE V

| Ingredient: | Amount/tablet |
|---|---|
| Starch U.S.P. corn | 13 |
| L-prolyl L-luecyl glycine amide | 50 |
| Calcium phosphate dibasic NF dihydrate | 132 |
| Water purified U.S.P. distilled, q.s. | |
| Magnesium stearate | 1 |
| Talcum (talc U.S.P.) powder | 4 |
| | 200 |

Tablets are prepared by using the above formula as follows: First a granulating step is carried out. Here a starch paste is made by adding 8 mg. of cornstarch to water and then heating. The tripeptide is then milled with 5 mg. of additional cornstarch in an equal volume of calcium phosphate dibasic through a 40 mesh screen into a mass mixer. After sufficient mixing the balance of the calcium phosphate dibasic is milled through the 40 mesh screen and thereafter added to the mixer.

The hot cornstarch paste is then also added to the mixer and mixing is carried out until a granular stage is reached. In some instances additional warm water may be added, if necessary. Granulation is carried out through a ⅝" band. The granulated mixture is dried in a hot air oven at 50° C. overnight to 1.0% L.O.D. (Brabender ½ hr.). After drying the mixture is sifted and then ground to 16 mesh.

Lubricating is carried out by charging half of the granulation into a blender. Talc and magnesium stearate are screened through a 30 mesh screen and charged into the blender. The remainder of the granulation is added and blended 15 minutes.

In order to form tablets compression of the granulated material is carried out by using a 9/32" standard convex punch. The resultant tablets have a hardness of 7-9 and 10 tablets weigh 2.00 g.

What is claimed is:

1. A method of treating a patient that is suffering from Parkinson's disease which comprises administering to said patient 1-40 mg./kg. of body weight daily of L-prolyl L-leucyl glycine amide.

2. A pharmaceutical composition in unit dosage form effective against Parkinson's disease which comprises an active portion comprising 1-500 mgs. L-prolyl L-leucyl glycine amide, and a pharmaceutically acceptable carrier, said composition being in a physical form selected from the group consisting of a capsule, a tablet and a pill.

3. A method of treating a patient suffering from Parkinson's' disease which comprises administering to said patient at least an effective dosage of a composition comprising a combination of L-Dopa and L-prolyl L-leucyl glycine amide said dosage being in the amount of 0.1-40 mg./kg. of said L-prolyl L-leucyl glycine amide and 1-500 mg./kg. of said L-Dopa.

4. A pharmaceutical composition in unit dosage form effective against Parkinson's' disease which comprises an active portion comprising in combination 1-500 mgs. L-Dopa and 1-250 mgs. L-prolyl L-leucyl glycine amide and a pharmaceutically acceptable carrier.

References Cited

Celis et al.: Proc. Nat. Acad. Sci. U.S.A., vol. 68, No. 7, pp. 1428-1433 (1971).

Nair et al.: Biochem. & Biophysical Research Comm., vol. 43, No. 6 (1971), pp. 1376-1381.

STANLEY J. FRIEDMAN, Primary Examiner

U.S. Cl. X.R.

424—319